United States Patent

Ashton et al.

[11] 3,951,800
[45] Apr. 20, 1976

[54] METHOD OF STORING SLUDGE RECOVERED FROM THE HOT WATER EXTRACTION OF BITUMEN FROM TAR SANDS

[75] Inventors: John E. Ashton, Fort McMurray; H. James Davitt, Edmonton, both of Canada

[73] Assignee: Great Canadian Oil Sands Limited, Toronto, Canada

[22] Filed: Sept. 11, 1974

[21] Appl. No.: 504,922

[52] U.S. Cl. ............................. 210/83; 208/13
[51] Int. Cl.² ................................. B01D 21/01
[58] Field of Search ............ 210/208, 207, 83, 84, 210/44, 42, 219, 525, 49, 20, 256, 221; 208/11, 13

[56] References Cited
UNITED STATES PATENTS

| | | |
|---|---|---|
| 3,271,293 | 9/1966 | Clark .............................. 208/11 |
| 3,723,310 | 3/1973 | Lang et al. ....................... 208/11 |
| 3,816,305 | 6/1974 | Schutte .............................. 210/42 |
| 3,850,810 | 11/1974 | Teodoroiu .......................... 210/208 |

Primary Examiner—Charles N. Hart
Assistant Examiner—Benoit Castel
Attorney, Agent, or Firm—J. Edward Hess; Donald R. Johnson; Richard P. Maloney

[57] ABSTRACT

An environmentally attractive method for storing sludge containing water, mineral matter, bitumen, and liquid hydrocarbon formed in a retention pond used to store effluent discharge waste streams associated with aqueous extraction of bitumen from tar sands comprising inserting the sludge below the surface of an unpolluted pond.

1 Claim, 1 Drawing Figure

U.S. Patent    April 20, 1976      3,951,800
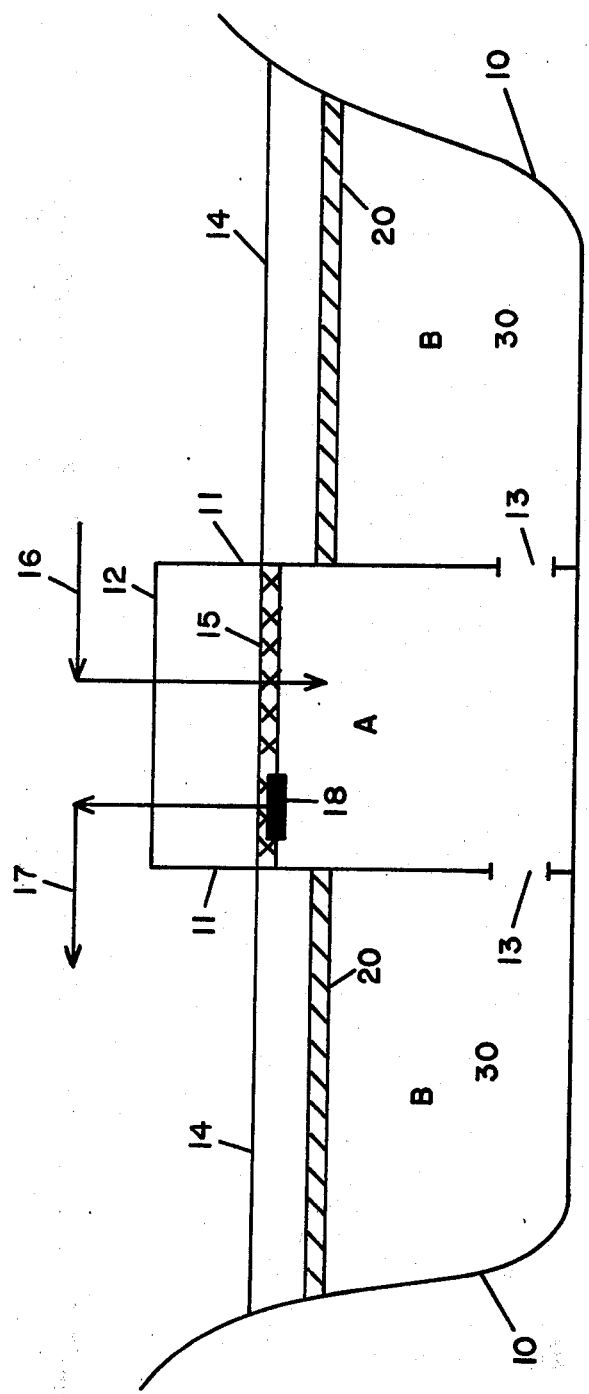

METHOD OF STORING SLUDGE RECOVERED FROM THE HOT WATER EXTRACTION OF BITUMEN FROM TAR SANDS

BACKGROUND OF THE INVENTION

The present invention relates to an improvement in aqueous processes for extracting bitumen from tar sands. This invention particularly relates to treatment of bitumen-containing sludge formed in waste water storage ponds associated with the hot water extraction of bitumen from tar sands. More particularly, this invention relates to a method for storing the sludge layer formed in a waste water retention pond to provide sludge storage zones substantially free of surface contamination.

Tar sands, which are also known as oil sands and bituminous sands, are siliceous materials which are impregnated with a heavy petroleum. The largest and most important deposits of the sands are the Athabasca sands, found in northern Alberta, Canada. These sands underlay more than 13,000 square miles at a depth of 0 to 2000 feet. Total recoverable reserves after extraction and processing are estimated at more than 300 billion barrels—just equal to the world-wide reserves of conventional oil, sixty percent of which is in the Middle East. By way of contrast, the American Petroleum Institute estimated total United States oil reserves at the end of 1965 at 39.4 billion barrels.

The tar sands are primarily silica, having closely associated therewith an oil film which varies from about 5 percent to 21 percent by weight, with a typical content of 13 weight percent of the sand. The oil is quite viscous—6° to 8° API gravity—and contains typically 4.5 percent sulfur and 38 percent aromatics.

The sands contain, in addition to the oil and sand components, clay and silt in quantities of from 1 to 50 weight percent, more usually 10 to 30 percent. The sands also contain a small amount of water, in quantities of 1 to 10 percent by weight, in the form of a film around the sand grains.

Several basic extraction methods have been known for many years for the separation of oil from the sands. In the so called "cold water" method, the separation is accomplished by mixing the sands with a solvent capable of dissolving the bitumen constituent. The mixture is then introduced into a large volume of water, water with a surface active agent added, or a solution of a neutral salt in water, which salt is capable of acting as an electrolyte. The combined mass is then subjected to a pressure or gravity separation.

In the hot water method, as disclosed in Canadian Pat. No. 841,581 issued May 12, 1970, the bituminous sands are jetted with steam and mulled with a minor amount of hot water at temperatures of 170° to 190°F., and the resulting pulp is then dropped into a turbulent stream of circulating hot water and carried to a separation cell maintained at a temperature of about 185°F. In the separation cell, sand settles to the bottom as tailings and oil rises to the top in the form of a froth. An aqueous middlings layer comprising clay and silt and some oil is formed between these layers. This basic process may be combined with a scavenger step for further treatment of the middlings layer obtained from the primary separation step to recover an additional amount of oil therefrom.

The middlings layer, either as it is recovered from the primary process or as it is recovered after the scavenger step, comprises water, clay, and oil. The oil content is, of course, higher in middlings which have not undergone secondary scavenger steps.

Hereinafter in this specification, the term "effluent discharge" will be used to describe middlings material of depleted oil content which has undergone final treatment and which comprises some bitumen and clay dispersed in water. Also, the term "effluent discharge" includes the sand tailings of either a primary extraction cell or a scavenger cell, each of which contains some clay and bitumen. In essence, the term "elffluent discharge" includes all waste water streams associated with aqueous extraction of bitumen from tar sands.

In a hot water extraction process, effluent discharge, which is the combined waste water streams from the entire extraction process, is removed from the process plant as a slurry of about 35 to 55 and typically 45 percent solids by weight. Included in the slurry are sand, silt, clay, and small quantities of bitumen. In this specification, sand is siliceous material which will not pass a 325 mesh screen. Silt will pass 325 mesh but is larger than 2 microns. Clay is material smaller than 2 microns including some siliceous material of that size. Included, also, in the slurry are quantities of bitumen ranging from about 0.5 to 2.0 weight percent of the total discharge.

Because the effluent contains oil emulsions, finely dispersed clay with poor settling characteristics, and other contaminants, water pollution considerations prohibit discarding the effluent into rivers, lakes, or other natural bodies of water. The disposal of the effluent discharge has, therefore, presented a problem. Currently, effluent discharge is stored in retention ponds which involve large space requirements and the construction of expensive enclosure dikes. A portion of the water in the retention pond is recycled back into the hot water extraction process as an economic measure to conserve water storage space. However, experience has shown that the dispersed silt and clay content of the recycled water can reduce primary froth yield by increasing the viscosity of the middlings layer and retarding the upward settling of oil flecks. When this occurs, the smaller oil flecks and those that are more heavily laden with mineral matter stay suspended in the water of the separation cell and are removed from the cell with the middlings layer.

Effluent discharge from the hot water process for extracting bitumen from tar sands are generally disclosed contains a substantial amount of mineral matter much of which is colloidally dispersed in the effluent discharge and, therefore, does not settle very readily when stored in the retention pond. The lower layer of the retention pond can contain at least 5 percent and up to 50 percent of dispersed clay and silt as well as up to 5 percent bitumen. This part of the pond water is normally referred to as sludge. Sludge is not suitable for recycling to the hot water extraction process for the reason that its addition into the separation cell or the scavenger cell at the normal inlet means would raise the mineral content of the middlings of the cells to the extent that recovery of bitumen would be substantially reduced.

Generally, the settling which does take place in a storage pond provides a body of water in which the concentration of mineral matter increases substantially from the surface of the pond to the bottom thereof. As a typical example, a pond of effluent discharge having a surface area of about 1000 acres and an average depth of 40 feet can be characterized somewhat as follows:

a. From the surface of the pond to a depth of 15 feet, the mineral concentration which is primarily clay is found to be about 0.5 up to 5.0 weight percent. This pond water can normally be recycled to a hot water extraction process without interfering with the extraction of bitumen from tar sands. Also, the surface of the pond contains bitumen and liquid hydrocarbon diluent which float to the surface during the time of storage. A pond with liquid hydrocarbons floating on the surface can be damaging to wildlife, particularly wild ducks and geese if they land on the pond.

b. The layer of water in the pond between 15 and 25 feet from the surface contains between 5.0 to up to 15 percent mineral matter and some bitumen. This water, if recycled to the separation cell feed with fresh tar sands, would increase the mineral content of the middlings portion of the cell to the point that little bitumen would be recovered.

c. Finally, the section of the pond between 25 feet and the bottom of the pond contains 15 percent up to 50 percent mineral matter.

In general, pond water containing more than 5 weight percent mineral matter can be referred to as sludge. Thus, water in areas of the pond described as (b) and (c) above can be included in the general definition of sludge in the present description.

Although some settling in the sludge layer is realized, the rate is such that over a period of years it is hardly noticeable. However, when the aqueous sludge is disturbed, the balance is upset so that often the bitumen in the sludge is loosened from the minerals to which it is attached and floats to the surface of the pond. This is particularly noticeable if sludge is pumped from one storage zone to another. Sludge is sometimes transferred from a pond to make more room for sand and other solids.

Bitumen on the surface of any outdoor storage pond can be detrimental to wildlife in the area, particularly birds, if they land upon or swim over the surface of the pond. Therefore, it is desirable to store sludge in a manner by which the quantity of bitumen on the surface of the storage area is minimized. Thus, it is desirable to store sludge in an outdoor area so that the upper layer of the storage zone contains little or no bitumen and mineral matter. By the methods of the present invention, this object can be accomplished.

DESCRIPTION OF THE INVENTION

The present invention relates to a method for storing bitumen-containing sludge formed in a retention pond used to store effluent discharge recovered from the hot water extraction of bitumen from tar sands. This invention provides a means for the recovery of additional bitumen from tar sands treated by a hot water extraction procedure. This invention also provides for outdoor open storage of sludge in a manner which does not negatively affect the local environment.

By the method of the present invention, sludge which has formed in a quiescent retention pond used for storing effluent discharge recovered from an aqueous method of recovering bitumen from tar sands is transferred to a storage area comprised of a receiving zone and a storage zone. The receiving zone of the storage area can be described as a receiving well or tank in which the sludge is first deposited when transferred from its original storage area. This receiving zone communicates with the generally larger open storage zone via subsurface openings in a barrier which separates the closed receiving zone from the general storage zone.

The open storage zone contains a surface layer of substantially unpolluted water. When the sludge is transferred to the receiving well, disturbed bitumen and/or liquid hydrocarbons float to the top of the receiving well and are removed. Because of the confined nature of the receiving well, there is little or no distrubance of the surface zone of the storage area. The sludge from the receiving well enters the storage area via openings in the lower portions of the receiving well which communicate with the storage zone below the surface of the water therein. When entering the storage zone from the receiving well, the sludge displaces the fresh water layer in the storage zone upwardly because of the higher density of the sludge. Thus, the sludge storage zone is composed of two layers, an upper surface layer of substantially uncontaminated water and a lower subsurface layer of sludge. Therefore, the present invention provides a method for storing bitumen-containing sludge in a manner which does not substantially affect the environment, comprising settling said sludge in a settling or confined zone extending below the surface of a retention zone having an upper layer of substantially pollution-free water.

Occasionally, the surface of a storage pond of the type disclosed in the present invention will be disturbed sometimes violently. These disturbances can be associated with climatic changes resulting in heavy winds and precipitation. Such disturbances can cause parts of the sludge layer to be mixed with the upper pollution-free layer of the zone, thereby resulting in a zone with surface pollution. However, a method for overcoming this problem has been discovered.

It has been discovered that by treating the unpolluted surface water layer of the sludge storage zone with a flocculating agent, the intrusion of sludge contamination into the surface water layer can be substantially suppressed or diminished. The flocculating agents can be added to the surface water before, during, or after the sludge layer has been introduced into the storage zone. It is preferable to add the flocculating agent prior to the time the surface water layer comes in contact with the sludge layer.

Among the various reagents useful for flocculating clay are aluminum sulfate (alum), polyalkylene oxides such as polyethylene oxide, compounds of calcium such as calcium hydroxide, calcium oxide, calcium chloride, calcium nitrate, calcium acid phosphate, calcium sulfate, calcium tartrate, calcium citrate, calcium sulfonate, calcium lactate, the calcium salt of ethylene diamine tetra-acetate, and similar organic sequestering agents. Also suitable are guar flour or a high molecular weight acrylamide polymer such as polyacrylamide or a copolymer of acrylamide and a copolymerizable carboxylic acid such as acrylic acid. Additional flocculants include the polymers of acrylic or methacrylic acid derivatives, for example, acrylic acid, methacrylic acid, the alkali metal and ammonium salts of acrylic acid or methacrylic acid, acrylamide, methacrylamide, the aminoalkyl acrylates, the aminoalkyl acrylamides, the aminoalkyl methacrylamides, and the N-alkyl substituted aminoalkyl esters of either acrylic or methacrylic acids.

To further define the invention, the drawing provided herewith is presented. Referring to the drawing, a storage zone 30 having a surface exposed to the atmosphere is defined by line 10 which outlines the bottom and sides of the zone. In actual practice, the zone can be a large outdoor pond having earthern walls or dikes. The zone, as pictured, is subdivided into section A and section B as shown. However, in actual use, the storage area can be subdivided into an unlimited number of zones. Section A represents a receiving well or zone into which sludge containing bitumen and/or liquid hydrocarbons is delivered via line 16 from its previous storage area. The receiving zone A is defined by walls 11 and top 12. The walls of zone A extend below the surface of the liquid 30 in zone B. Opening 13 in the lower section of the receiving well permits the more dense sludge to flow out of the receiving well into zone B below layer 14 of zone B which is a surface layer of clean substantially unpolluted water which can contain a flocculating agent in accordance with one mode of the method of the present invention. Situated between surface water 14 and sludge storage area B is a layer 20. Layer 20 is a layer of flocculated contaminants which often forms at the interface between the sludge layer and the surface water layer of the pond in one aspect of the method of the present invention. The layer forms at the interface of the surface water and sludge layer by flocculation of dispersed solids in both the sludge layer which contacts the surface layer containing the flocculant and the surface water layer. This interface layer can serve as a barrier separating the sludge layer from the surface water layer thereby diminishing the probability of the intermixing of the two layers. The net result of this accomplishment is a storage zone which is better protected against the hazard of having the clean surface waters contaminated with the impurities of the sludge layer stored therebelow. Thus, the present invention provides an improved method for storing sludge in an outdoor storage zone. Zone A is essentially the settling zone for the disturbed sludge. The upper surface of zone A, 15 in practice, usually contains bitumen and other hydrocarbons which float to the surface in the zone. The bitumen and other hydrocarbons are recovered from the surface 15 of the zone A by a standard skimming device 18 and can be returned to be processed via line 17 into bitumen product. The flocculating agent is added to the surface water layer in the concentration range of 1 to 100 pounds of flocculating agent per 1000 gallons of water. The preferred range is 5 to 20 pounds of flocculating agent per 1000 gallons of water. Generally, the surface water of the sludge storage zone should contain sufficient flocculating agent to inhibit admixture of the lower sludge layer of the storage zone with the upper clear water layer of that same zone. Means of adding the flocculating agent to the water layer are well known in the art.

Essentially, by storing sludge in this manner, two ends are accomplished. They are: (a) additional bitumen is recovered from the sludge and (b) the surface of the sludge storage zone is maintained in a substantially pollutionfree manner, thereby having no adverse affect on the wildlife or general environment of the area the sludge storage zone occupies.

As a means of further defining the method of the present invention, the following specific embodiment of one mode of the method is provided.

A sludge storage zone defined as an outdoor open pit 35 feet wide by 60 feet long and 5 feet deep is provided with a receiving well which is a 2 foot by 3 foot steel tank with an open top. The receiving well extends downwardly from the top level of the pit to the bottom thereof with a 48 square inch opening near the bottom of the well. The pit was filled to a depth of 2 feet with substantially clean water. Sludge was added to the pit through the receiving well. The water after placement in the pit was characterized by standard water analysis methods as having a pH of 8.12, a petroleum content of 8.1 ppm, a phenol content of 0.2 ppm, and a total solids content of 438 ppm including dissolved solids. The pit was thereafter raised to a level of 4 feet in depth by the addition of aqueous sludge through the receiving well after transfer from an effluent discharge retention pond associated with a hot water extraction procedure for the recovery of bitumen from tar sands. The sludge was characterized as containing 3.7 weight percent bitumen and liquid hydrocarbons, 20.8 weight percent mineral matter, and the remainder water. The sludge was introduced into the pit through an inlet means into the open top of the receiving well and thereby permitted to fill the entire pit by settling out through the bottom of the receiving well under the fresh water layer. The storage zone was retained undisturbed other than by weather for eight weeks. The surface water layer was again analyzed after the eight-week storage period. The results of the after-storage analysis as compared with the characteristics of the water prior to the sludge addition to the zone is provided in the table on the following page.

|  | Surface Water Quality | |
| --- | --- | --- |
|  | Before Sludge Addition to the Retention Zone | After Sludge Addition to the Retention Zone |
| pH | 8.12 | 8.30 |
| Phenol Content PPM | 0.20 | 0.07 |
| Oil and Grease Content PPM | 8.10 | 14.40 |
| Solids Content PPM | 438.00 | 600.00 |

This comparison of surface water analysis before and after the addition of sludge to the storage zone shows the effectiveness of the method of the present invention in providing a sludge storage area having substantially pollution-free surface water. Although there has been an increase in the amount of contaminants in the surface water, the surface water still has a much higher quality than that which is obtained when the sludge is merely added to the pit without the use of the receiving well. It is in this sense that the surface water is substantially pollutionfree, clean, uncontaminated, or the like.

The present invention provides a method for storing bitumen-containing sludge in an exposed reservoir without unfavorably affecting the environment. The method of the present invention comprises inserting bitumen-containing sludge into a settling zone extending below the surface of a substantially unpolluted open pond.

One method for storing sludge in an open pond without adversely affecting the environment comprises:

a. transferring the sludge to a confined settling zone located in and communicating with an open storage area containing a surface layer of uncontaminated water and b. settling the sludge below the surface of the uncontaminated water.

This method is effectively accomplished when the open storage area contains a receiving zone from which contaminants such as bitumen can be recovered located within or associated with the storage area and communicating with the water in the storage zone below the surface thereof.

The present invention also provides a unique apparatus for storing sludge in an open area. Generally, the apparatus comprises:
  a. dike means adapted to contain a body of water;
  b. a receiving well extending above and below the surface of said body of water;
  c. means for depositing said sludge into said receiving well;
  d. at least one opening near the bottom of said well to permit mineral matter in said sludge to pass into said body of water below the surface thereof, and
  e. means for removing bitumen from the surface of the sludge in the receiving well.

In another aspect, the present invention provides an improved method for storing sludge in an open pond without adversely affecting the environment which comprises:
  a. transferring the sludge to a confined settling zone located in and communicating with an open storage area containing a surface layer of uncontaminated water which contains a sufficient quantity of flocculating agent to fluocculate any solid contaminants therein and
  b. settling the sludge below the surface of the uncontaminated water.

By the term "substantially unpolluted water" as disclosed herein is meant water which contains a small amount of pollution in either dissolved or solid form and usually contains less than 5 weight percent dispersed mineral solids. Water which does not physically harm wildlife such as birds or other land animals when they come in physical contact with the water, exclusive of drinking the water, is defined as substantially unpolluted.

The invention claimed is:

1. A method for storing sludge containing mineral matter and bitumen colloidally dispersed therein, said storage being substantially free of environmental hazards, said sludge having been formed in an open retention pond used to store effluent discharge waste water streams derived from the hot water extraction of bitumen from tar sands comprising:
  a. transferring said sludge to a receiving well within a storage zone containing a layer of substantially unpolluted water on the surface thereof, said water containing an effective quantity of a flocculating agent, said receiving well communicating with the storage zone below said layer;
  b. settling said sludge in the receiving well to permit bitumen to float to the surface thereof while said sludge settles into the storage zone below the unpolluted surface layer;
  c. recovering bitumen and liquid hydrocarbons on the surface of said receiving well.

* * * * *